Figure 1:
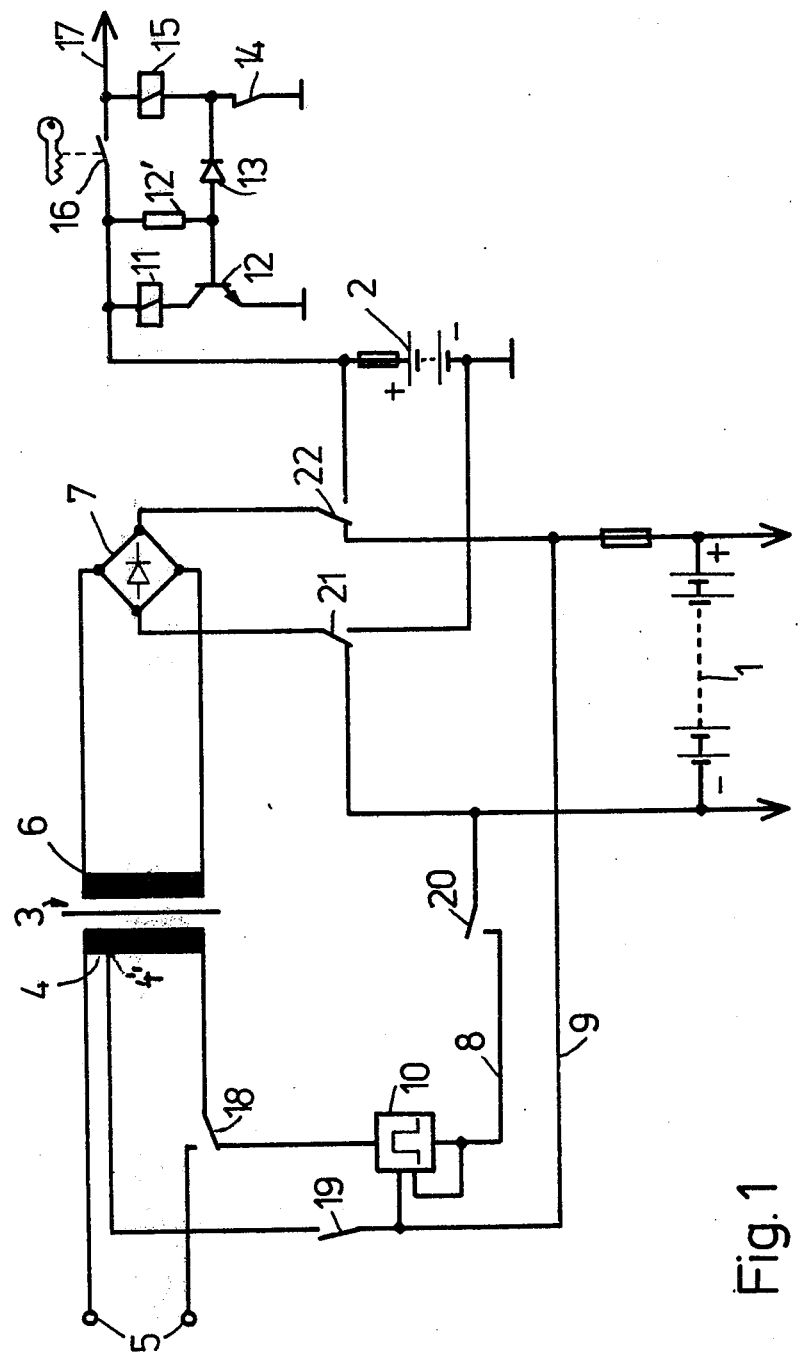

United States Patent [19]

Kapfhammer

[11] 4,170,748
[45] Oct. 9, 1979

[54] CIRCUIT ARRANGEMENT FOR ELECTRICALLY DRIVEN MOTOR VEHICLES

[75] Inventor: Karl Kapfhammer, Germering, Fed. Rep. of Germany

[73] Assignee: Bayerische Motoren Werke Aktiengesellschaft, Fed. Rep. of Germany

[21] Appl. No.: 929,958

[22] Filed: Aug. 1, 1978

[30] Foreign Application Priority Data

Aug. 9, 1977 [DE] Fed. Rep. of Germany ....... 2735809

[51] Int. Cl.² .............................................. H02P 5/00
[52] U.S. Cl. ............................................ 318/139; 320/3
[58] Field of Search ....................... 318/139; 320/3, 15, 320/19; 307/48, 49, 75

[56] References Cited
U.S. PATENT DOCUMENTS

| | | | |
|---|---|---|---|
| 3,671,843 | 6/1972 | Huntzinger et al. | 320/15 |
| 3,904,947 | 9/1975 | Crews | 318/139 |
| 4,066,936 | 1/1978 | Horota | 320/3 |

*Primary Examiner*—David Smith, Jr.
*Attorney, Agent, or Firm*—Craig and Antonelli

[57] ABSTRACT

A circuit arrangement for electrically driven motor vehicles with an electric driving motor which is fed from a driving battery, with a transformer which is adapted to be connected on the primary side to an A.C. power supply network and on the secondary side by way of a rectifier arrangement to the driving battery, and with a D.C. converter which includes a chopper, an A.C. voltage step-down device and a rectifier and which recharges a power supply battery having a rated voltage that is lower than that of the driving battery, from the driving battery; the transformer thereby forms the A.C. step-down device, to one side of which the driving battery is connected by way of the chopper and to the other side of which the power supply battery having a correspondingly matched stepped-down ratio is connected by way of the rectifier.

8 Claims, 2 Drawing Figures

CIRCUIT ARRANGEMENT FOR ELECTRICALLY DRIVEN MOTOR VEHICLES

The present invention relates to a circuit arrangement for electrically driven motor vehicles with an electric driving motor that is supplied from a driving battery, with a transformer which is adapted to be connected on the primary side to an alternating-current power supply network and on the secondary side to the driving battery by way of a rectifier arrangement, and with a direct-current voltage converter which includes a chopper, an alternating-current voltage-step-down device and a rectifier and which recharges a power supply battery having a rated voltage which is smaller compared to that of the driving battery, from the driving battery. Such a circuit arrangement is known in the prior art (ATZ 73, 1971, pages 342-346).

The present invention is concerned with the task to provide a circuit arrangement of the aforementioned type in which the circuit and constructive expenditures for charging the power supply battery from the driving battery is kept small.

The underlying problems are solved according to the present invention in that the transformer forms the A.C. voltage step-down device, to one side of which is connected the driving battery by way of the chopper and to the other side of which is connected by way of the rectifier the power supply battery with a correspondingly matched stepped-down ratio.

The transformer which is present anyhow for charging the driving battery is utilized also in the driving operation. It takes over the function of the A.C. voltage step-down device and thus replaces the same.

In the circuit arrangement according to the present invention, the driving battery may be connected during the driving operation by way of the chopper to the primary side or to the secondary side of the transformer and the power supply battery by way of the rectifier to the secondary side, respectively, the primary side of the transformer.

An advantageous further development of the circuit arrangement according to the present invention resides in that the rectifier (bridge rectifier) is adapted to be connected alternately as the rectifier arrangement between the secondary side of the transformer and the driving battery and as rectifier between the primary side or the secondary side of the transformer and the power supply battery. A separate rectifier arrangement for charging the power supply battery is then dispensed with.

Accordingly, it is an object of the present invention to provide a circuit arrangement for electrically driven motor vehicles which avoids by simple means the aforementioned shortcomings and drawbacks encountered in the prior art.

Another object of the present invention resides in a circuit arrangement for electrically driven motor vehicles which is simple in construction and highly effective for its intended purposes.

A further object of the present invention resides in a circuit arrangement for electrically driven motor vehicles in which the costs and expenditures for the circuits and the construction thereof, especially for purposes of charging the power supply battery from the driving battery, can be kept extraordinarily small.

Still another object of the present invention resides in a circuit arrangement for electrically driven motor vehicles which ascribes dual functions to certain parts already present to keep as small as possible the number of parts required for the entire circuit arrangement.

Another object of the present invention resides in a circuit arrangement for electrically driven motor vehicles, in which the number of parts required for proper operation is effectively minimized.

Figure 2:
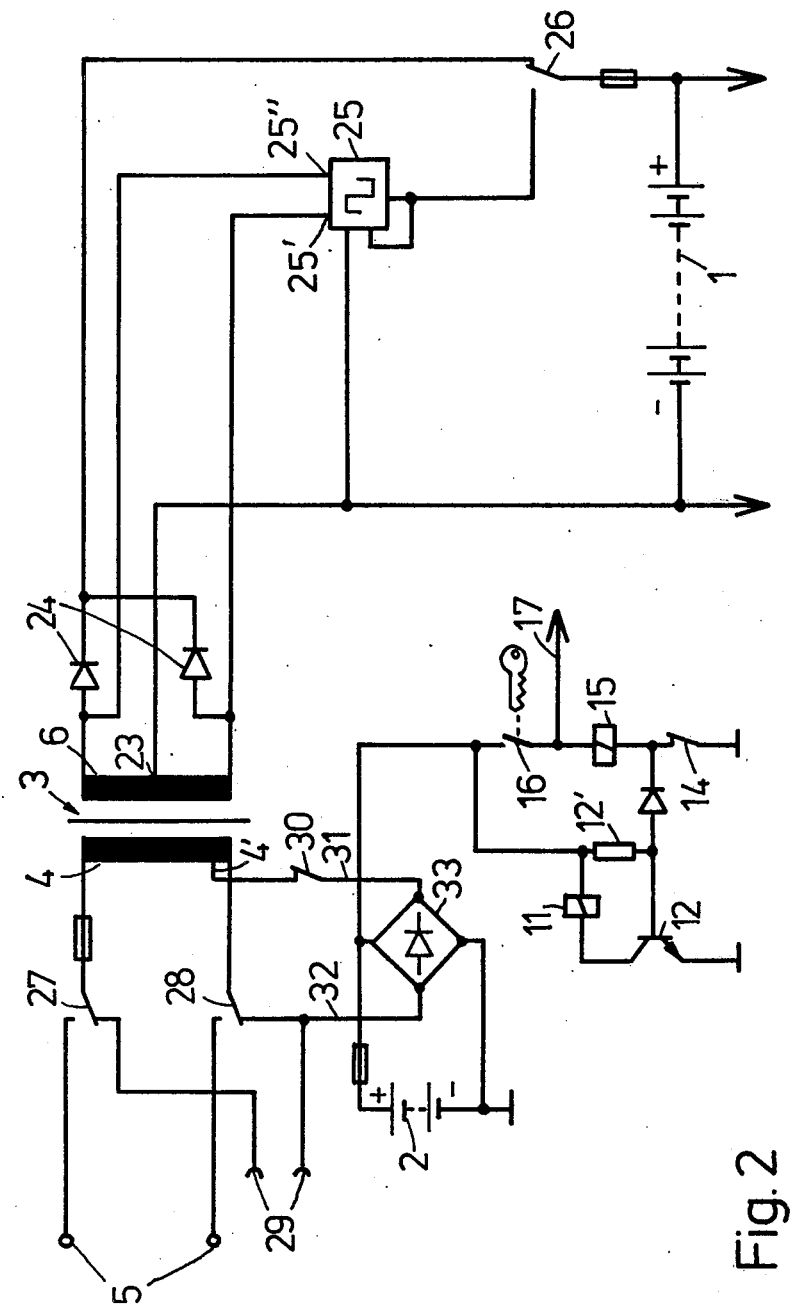

These and other objects, features and advantages of the present invention will become more apparent from the following description when taken in connection with the accompanying drawing which shows, for purposes of illustration only, two embodiments in accordance with the present invention, and wherein:

FIG. 1 is a schematic circuit diagram for an electrically driven motor vehicle in accordance with the present invention, in which a driving battery is connected during the driving operation for purposes of recharging the power supply battery to the primary side of a transformer by way of a simple chopper or vibrator; and FIG. 2 is a modified embodiment of a circuit arrangement of the present invention for an electrically driven motor vehicle in accordance with the present invention, in which in modification of the circuit arrangement of FIG. 1, the driving battery is connected to the secondary side of the transformer by way of a push-pull chopper.

Referring now to the drawing wherein like reference numerals are used throughout the two views to designate like parts, the circuit arrangement according to FIG. 1 includes a driving battery 1 of, for example 144 V for the supply of an electric motor (not shown) for the drive of the motor vehicle as well as a power supply battery 2 of, for example, 12 V for the supply of electric loads (also not illustrated), such as windshield wipers and lighting system. A transformer generally designated by reference numeral 3 for charging the driving battery 1 of the motor vehicle is adapted to be connected with its primary side 4 to a power supply network of, for example, 220 V/50 Hz A.C. voltage (connections 5) and with its secondary side 6 by way of a rectifier arrangement in the form of a bridge rectifier 7 to the driving battery 1. Electric lines 8 and 9 lead from the driving battery 1 to the primary side 4 of the transformer 3, whereby the line 8 includes a single-acting vibrator or chopper 10 and the line 9 establishes a connection with a winding tap 4'.

A charging relay 11 and the collector-emitter-circuit of a transistor 12 are connected in series between the power supply battery 2 and the ground terminal of the power supply network while a reference resistance 12' is connected in parallel thereto. The base of the transistor 12 is connected by way of a diode 13 and a charging switch 14 to the ground terminal of the power supply network. A driving relay 15 which is connected in series with a driving switch 16 is connected in parallel with the charging relay 11. A branch connection 17 between the driving switch 16 and the driving relay 15 leads to the loads.

The charging relay 11 includes a switching contact 18 which in its normal, rest position, i.e., with relay 11 de-energized, connects the line 8 with one winding end of the primary side 4 of the transformer 3 and in its operating position, i.e., with relay 11 energized, one of the two connections 5 of the power supply network with the same winding end of the primary side 4 of the transformer 3. The driving relay 15 includes operating contacts 19 and 20 in the line 8 and in the line 9, respectively, as well as switching contacts 21 and 22, which in the normal, rest position, i.e., with relay 15 de-energized, connect the battery 1 with the bridge rectifier 7 and in the operating position, i.e., with relay 15 energized the power supply battery 2 with the bridge rectifier 7.

During the charging of the driving battery 1 from an alternating current power supply network, the driving switch 16 and the charging switch 14 which, for example, is connected with an appropriate charging lid (not shown) are opened. The driving relay 15 is not energized whereas the transistor 12 by reason of the interrupted connection of its base with the ground terminal becomes conductive and the charging relay 11 is thereby energized. The switching contact 18 of charging relay 11 establishes the connection between the A.C. power supply network, which is then connected to the connections 5, and the primary side 4 of the transformer 3. The A.C. voltage which results on the secondary side 6 of the transformer 3 with a magnitude determined by the step-down ratio of the transformer 3 is rectified by the bridge rectifier 7 and charges the driving battery 1 by way of the switching contacts 21 and 22 which are now in the illustrated normal rest position. A suitable charging monitoring device of any conventional construction thereby prevents an overcharging of the driving battery 1.

In the driving operation of the motor vehicle, the charging switch 14 as well as the driving switch 16 are closed. The transistor 12 now becomes non-conductive and the charging relay 11 is de-energized whereas the driving relay 15 is energized from the power supply battery 2. The operating contacts 19 and 20 of the charging relay 15 are closed and establish a connection from the driving battery 1 by way of the single vibrator or chopper 10 to the primary side 4 of the transformer. Furthermore, the switching contacts 21 and 22 of relay 15 shift into their operating position.

The single chopper 10 supplies with a predetermined frequency of, for example, 50 Hz, rectangular voltage pulses of 10 msec duration and 144 V each, i.e., the output voltage of the driving battery 1, to the primary side 4 of the transformer 3. A rest pause of a duration of also 10 msec exists in each case between two voltage pulses. The A.C. voltage which results on the secondary side of the transformer 3 is rectified by the bridge rectifier 7. The thus-produced D.C. current charges the power supply battery 2 from the driving battery 1.

Thus, the transformer 3 and the bridge rectifier 7 can be utilized during the driving operation both for the charging of the driving battery 1 as also for the recharging of the power supply battery 2 with relatively low circuit expenditures and without the necessity of a separate A.C. voltage step-down device for charging the power supply battery 2.

In FIG. 2, the same parts are designated by the same reference numerals as in FIG. 1.

The secondary side 6 of the transformer 3 includes twice the number of windings of the secondary side of the transformer in FIG. 1 as well as additionally a center tap 23 which is permanently connected with the negative terminal (−) of the driving battery 1. The two ends of the secondary side 6 of the transformer 3 of FIG. 2 are connected by way of unidirectional rectifiers 24 as well as by way of a switching contact 26 of the driving relay 15 in the normal rest position thereof, i.e., with relay 15 de-energized, with the positive terminal (+) of the driving battery 1.

A push-pull vibrator or chopper 25 is adapted to be interconnected by the switching contact 26 in the operating position thereof between the driving battery 1 and the secondary side 6 of the transformer 3. The chopper 25 is permanently connected, on the one hand, with the center tap 23 and, on the other, with its two outputs 25′ and 25″ with the two ends of the secondary side 6.

The charging relay 11 includes two switching contacts 27 and 28 which in the operating position, i.e., with relay 11 energized, connect the connections 5 for the power supply network with the primary side 4 of the transformer 3 and in the rest position connect two additional connections 29 with the primary side 4 of the transformer 3, as well as one normally closed contact 30. The contact 30 is connected in a line 31 which together with a parallel line 32 establishes a connection with a winding tap 4′ of the primary side 4 and leads to the power supply battery 2 by way of a bridge rectifier 33.

Corresponding to the circuit arrangement of FIG. 1, with an opened charging switch 14 and therewith with an energized charging relay 11, the A.C. current supply network can be connected by way of the connections 5 to the primary side 4 of the transformer 3 and thus the driving battery 1 can be charged by way of the secondary side 6 and the two rectifiers 24. Also in this case a charge monitoring device of conventional construction prevents an overcharging of the driving battery 1.

In the driving operation, i.e., with a closed driving switch 16 and with a closed charging switch 14, the charging relay 11 is not energized whereas the driving relay 15 is energized and connects by way of its switching contact 26 the battery 1 with the secondary side 6 of the transformer 3 by way of the push-pull chopper 25. The push-pull chopper 25 thereby switches with a constant switching frequency, for example, of 100 Hz, the D.C. voltage of the driving battery 1 appearing at its input alternately to its outputs 25′ nd 25″ and therewith loads the secondary side 6 of the transformer 3 with an A.C. voltage of half the switching frequency, in the selected example, of 50 Hz, and of rectangular configuration. The power supply battery 2 is thus charged from the winding tap 4′ of the primary side 4 by way of the bridge rectifier 33.

Simultaneously therewith, conditioned by the number of turns of the secondary side which is doubled compared to FIG. 1, a rectangular A.C. voltage is available at the connections 29 with a magnitude that is equal to that of the A.C. power supply network. The circuit arrangement according to FIG. 2 thus additionally serves as emergency power supply, i.e., with a closed driving switch 16 as well as with a closed charging switch 14, an A.C. voltage corresponding to the power supply voltage can be picked up at the connections 29.

In the alternative to the illustrated circuit arrangements, for example, a single or push-pull chopper may be connected in a circuit arrangement corresponding to FIG. 2 to the secondary side of the transformer, which is provided with the same number of turns as the secondary side of the transformer in FIG. 1. Whereas the single-acting vibrator or chopper realizes the connection of the driving battery to the secondary side with constant polarity, the connection of the driving battery takes place by way of the push-pull vibrator or chopper with a polarity alternating with a constant frequency.

In lieu of a single vibrator or chopper in a circuit arrangement according to FIG. 1, the driving battery can also be connected to the primary side of the transformer by way of a push-pull vibrator or chopper.

While I have shown and described only two embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A circuit arrangement for electrically driven motor vehicles, comprising an electric motor fed from a driving battery means, a transformer means having a primary side and a secondary side, the primary side being adapted to be connected to an A.C. power supply network and the secondary side being adapted to be connected to the driving battery means by way of rectifier means, and a D.C. converter means including a vibrator means, an A.C. voltage step-down means and rectifier means, the D.C. converter means being operable to recharge a power supply battery means having a rated voltage lower in comparison to that of the driving battery means, from the driving battery means, characterized in that the transformer means forms the A.C. voltage step-down means, the driving battery means being operatively connected to one side of the transformer means by way of the vibrator means and the power supply battery means having a correspondingly matched stepped-down ratio being operatively connected to the other side of the transformer means by way of the rectifier means.

2. A circuit arrangement according to claim 1, characterized in that said one side is the primary side and the other side is the secondary side of the transformer means.

3. A circuit arrangement according to claim 1, characterized in that the vibrator means is a single-acting chopper.

4. A circuit arrangement according to claim 1, 2 or 3, characterized in that the rectifier means is a bridge rectifier.

5. A circuit arrangement according to claim 1, characterized in that the driving battery means is connected by way of the vibrator means to the primary side and the power supply battery means is connected to the secondary side of the transformer means by way of the rectifier means.

6. A circuit arrangement according to claim 1, characterized in that the driving battery means is connected by way of the vibrator means to the secondary side of the transformer means and the power supply battery means is connected to the primary side of the transformer by way of the rectifier means.

7. A circuit arrangement according to claim 6, characterized in that the vibrator means is a push-pull chopper.

8. A circuit arrangement according to claim 5, 6 or 7, characterized in that the rectifier means is adapted to be connected alternately as rectifier means between the secondary side of the transformer means and the driving battery means and as rectifier means between the primary side or the secondary side of the transformer means and the power supply battery means.

* * * * *